(12) United States Patent
Rowell et al.

(10) Patent No.: US 10,476,611 B2
(45) Date of Patent: Nov. 12, 2019

(54) COMPACT ANTENNA RANGE REFLECTOR WITH REDUCED EDGE DIFFRACTION

(71) Applicant: Rohde & Schwarz GmbH & Co. KG, Munich (DE)

(72) Inventors: Corbett Rowell, Munich (DE); Benoit Derat, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/858,722

(22) Filed: Dec. 29, 2017

(65) Prior Publication Data
US 2019/0207686 A1   Jul. 4, 2019

(51) Int. Cl.
| H04B 17/00 | (2015.01) |
| H04B 17/12 | (2015.01) |
| H01Q 15/14 | (2006.01) |
| H01Q 19/12 | (2006.01) |
| H04B 7/0413 | (2017.01) |

(52) U.S. Cl.
CPC .............. *H04B 17/12* (2015.01); *H01Q 15/14* (2013.01); *H01Q 15/141* (2013.01); *H01Q 19/12* (2013.01); *H04B 7/0413* (2013.01)

(58) Field of Classification Search
CPC ........ H04B 17/00; H04B 17/12; H04B 17/18; H04B 17/101; H01Q 15/14; H01Q 15/141; H01Q 19/12
See application file for complete search history.

(56) References Cited

U.S. PATENT DOCUMENTS

| 6,339,393 | B1 | 1/2002 | Burnside et al. | |
| 8,330,640 | B2 | 12/2012 | Lim | |
| 2010/0309439 | A1* | 12/2010 | Bi | G03B 21/2033 |
| | | | | 353/33 |
| 2014/0357210 | A1* | 12/2014 | Vilhar | G01R 29/10 |
| | | | | 455/226.4 |

* cited by examiner

*Primary Examiner* — Tuan Pham
(74) *Attorney, Agent, or Firm* — Ditthavong & Steiner P.C.

(57) ABSTRACT

A reflector for deflecting electromagnetic waves is provided. Said reflector comprises a resistive material along its edges in a specific pattern, wherein the resistive material has a resistance per square meter being higher than the resistance per square meter of the material of the reflector in order to attenuate and/or absorb electromagnetic energy of the electromagnetic waves.

15 Claims, 5 Drawing Sheets

COMPACT ANTENNA RANGE REFLECTOR WITH REDUCED EDGE DIFFRACTION

TECHNICAL FIELD

The invention relates to a reflector for deflecting electromagnetic waves with reduced edge diffraction, a manufacturing method for manufacturing said reflector, a measurement system comprising said reflector, and a measurement method applying said reflector.

BACKGROUND ART

Generally, in times of an increasing number of wireless communication applications such as MIMO (Multiple Input Multiple Output) systems, there is a growing need of investigating devices under test applying such systems with special respect to their far-field characteristics in order to verify their proper functioning. In this context, in order to ensure accurate and efficient measurements, edge diffraction should be reduced to a minimum.

U.S. Pat. No. 8,330,640 B2 is directed to an anechoic chamber lined with absorber to absorb electromagnetic energy incident upon the absorber and reflector edge interfaces. The chamber comprises a reflector to reflect waves from a source to form a substantially plane wave field in a test zone within the chamber. In some embodiments, the outer periphery of the reflector extends to the interior walls, floor and ceiling of the chamber. The outer periphery of the reflector is embedded in the absorber in some embodiments. Due to the fact that said reflector does not comprise any measure for reducing edge diffraction, measurements may be faulty and inefficient.

Accordingly, there is a need to provide a reflector for deflecting electromagnetic waves with reduced edge diffraction in order to ensure efficient and accurate measurements.

SUMMARY OF THE INVENTION

According to a first aspect of the invention, a reflector for deflecting electromagnetic waves is provided. Said reflector comprises a resistive material along its edges in a specific pattern, wherein the resistive material has a resistance per square meter being higher than the resistance per square meter of the material of the reflector in order to attenuate and/or absorb electromagnetic energy of the electromagnetic waves. Advantageously, edge diffraction can be reduced in order to ensure accurate and efficient measurements.

According to a first preferred implementation form of the first aspect, the reflector is at least partly of parabolic shape. Advantageously, complexity of the reflector can be reduced to a minimum in order to save costs.

According to a further preferred implementation form of the first aspect, the specific pattern is configured such that portions, especially attenuated portions, of the electromagnetic energy are diffracted away from a quiet zone with respect to the reflector. Additionally or alternatively, the specific pattern is configured such that portions, especially attenuated portions, of the electromagnetic energy are diffracted out of phase in a manner that the electromagnetic waves destructively interfere. Advantageously, interferences are suppressed in an efficient manner.

According to a further preferred implementation form of the first aspect, the specific pattern of the resistive material is configured to form at least one triangle, preferably at least one isosceles triangle, more preferably at least one symmetric isosceles triangle, on at least one edge of the reflector. Advantageously, the reflector can be produced in a cost-saving manner due to low complexity.

According to a further preferred implementation form of the first aspect, the specific pattern of the resistive material is configured to form at least one ellipsoid on at least one edge, especially on at least one rolled edge, of the reflector. Advantageously, the reflector complexity is low, which leads to cost-efficient manufacturing.

According to a further preferred implementation form of the first aspect, the resistive material is deposited as a film on the reflector surface or on an epoxy layer directly on the reflector surface. Advantageously, the reflector is mechanically particularly stable.

According to a further preferred implementation form of the first aspect, along the edges of the reflector, conductive fibers are mixed with resistive fibers. Advantageously, the degree of resistive characteristics of the reflector edges can easily be adjusted.

According to a further preferred implementation form of the first aspect, the resistance per square meter of the resistive material is between 30 milliohms and 10000 ohms, preferably between 100 milliohms and 5000 ohms, more preferably between 300 milliohms and 3000 ohms, most preferably between 1 ohm and 1000 ohm. Advantageously, this allows for reducing edge diffraction in a most efficient manner.

According to a second aspect of the invention, a manufacturing method for manufacturing an electromagnetic waves deflecting reflector is provided. Said manufacturing method comprises the step of depositing a resistive material as a film on the surface of the reflector or on a resin layer, especially on an epoxy layer, directly on the reflector surface, wherein the resistive material has a resistance per square meter being higher than the resistance per square meter of the material of the reflector. Advantageously, edge diffraction can be reduced in order to ensure accurate and efficient measurements. Further advantageously, the reflector is mechanically particularly stable.

According to a first preferred implementation form of the second aspect, the manufacturing method further comprises the step of creating the reflector, especially with the aid of a 3-dimensional printer, such that conductive fibers are mixed with resistive fibers along the edges of the reflector. Advantageously, the degree of resistive characteristics of the reflector edges can easily be adjusted.

According to a third aspect of the invention, a measurement system is provided. Said measurement system comprises at least one reflector according to the first aspect of the invention and/or its preferred implementation forms, at least one measurement antenna, and a device under test. In this context, the at least one reflector is arranged with respect to the at least one measurement antenna such that the at least one reflector collimates plane wave components to the device under test which is located outside a quiet zone. Additionally or alternatively, the at least one reflector is arranged with respect to the at least one measurement antenna such that the at least one reflector forms a planar wave from the at least one measurement antenna within a region of a quiet zone located between the at least one reflector and the device under test. Advantageously, edge diffraction can be reduced in order to ensure accurate and efficient measurements.

According to a first preferred implementation form of the third aspect, the measurement system further comprises a signal analysis unit, which is configured to communicate with the device under test with the aid of electromagnetic waves radiated and/or received by the at least one measurement antenna and redirected by the at least one reflector. Advantageously, this allows for active measurements with special respect to the far-field characteristics of the device under test.

According to a further preferred implementation form of the third aspect, the at least one reflector is at least partly of a parabolic shape. Advantageously, complexity of the reflector can be reduced to a minimum in order to save costs.

According to a further preferred implementation form of the third aspect, the measurement system further comprises a shielded room or chamber, wherein at least the device under test, the at least one measurement antenna, and the at least one reflector are within the shielded room or chamber. Advantageously, major interferences are avoided.

According to a fourth aspect of the invention, a measurement method is provided. Said measurement method comprises the step of arranging at least one reflector according to the first aspect of the invention and/or its preferred implementation forms with respect to at least one measurement antenna such that the at least one reflector collimates plane wave components to a device under test which is located outside a quiet zone and/or that the at least one reflector forms a planar wave from the at least one measurement antenna within a region of a quiet zone located between the at least one reflector and the device under test. Advantageously, edge diffraction can be reduced in order to ensure accurate and efficient measurements.

According to a first preferred implementation form of the fourth aspect, the measurement method further comprises the step of connecting a signal analysis unit to the at least one measurement antenna in order to communicate with the device under test with the aid of electromagnetic waves radiated and/or received by the at least one measurement antenna and redirected by the at least one reflector. Advantageously, this allows for active measurements with special respect to the far-field characteristics of the device under test.

According to a further preferred implementation form of the fourth aspect, the at least one reflector is at least partly of a parabolic shape. Advantageously, complexity of the reflector can be reduced to a minimum in order to save costs.

According to a further preferred implementation form of the fourth aspect, the measurement method further comprises the step of performing measurements within a shielded room or chamber, wherein at least the device under test, the at least one measurement antenna, and the at least one reflector are within the shielded room or chamber. Advantageously, major interferences are avoided.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
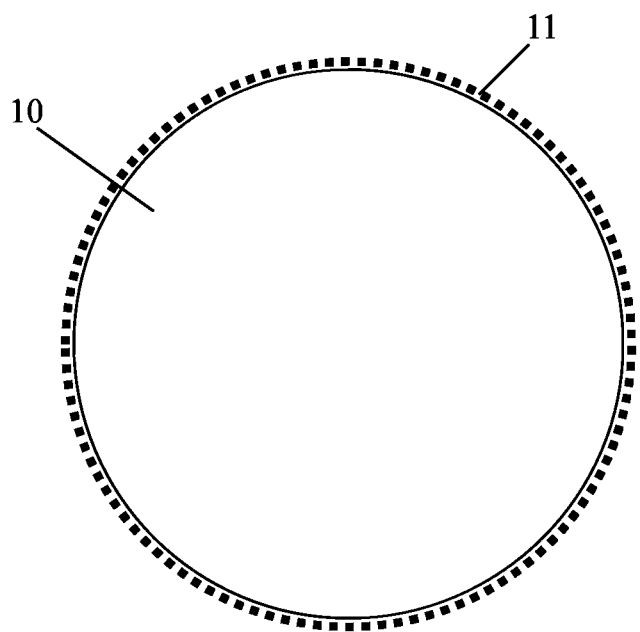
FIG. 1 shows a top view of an exemplary embodiment of the first aspect of the invention.

Firstly, FIG. 1 illustrates a reflector 10 for deflecting electromagnetic waves according to the first aspect of the invention. Said reflector 10 comprises a resistive material along its edges in a specific pattern 11, wherein the resistive material preferably has a resistance per square meter being higher than the resistance per square meter of the material of the reflector 10 in order to attenuate and/or absorb electromagnetic energy of the electromagnetic waves.

As it can be seen from FIG. 1, the reflector 10 is of parabolic shape. Alternatively, the reflector 10 may preferably be at least partly of parabolic shape.

With respect to said specific pattern 11, it is noted that the specific pattern 11 is configured such that portions, especially attenuated portions, of the electromagnetic energy are diffracted away from a quiet zone with respect to the reflector 10.

Additionally or alternatively, the specific pattern 11 is configured such that portions, especially attenuated portions, of the electromagnetic energy are diffracted out of phase in a manner that the electromagnetic waves destructively interfere.

Moreover, with respect to said resistive material, it is noted that the resistive material may preferably be deposited as a film on the surface of the reflector or on an epoxy layer directly on the reflector surface. In this context, along the edges of the reflector 10, conductive fibers may preferably be mixed with resistive fibers.

In addition to this, the resistance per square meter of the resistive material may be between 30 milliohms and 10000 ohms, preferably between 100 milliohms and 5000 ohms, more preferably between 300 milliohms and 3000 ohms, most preferably between 1 ohm and 1000 ohm.

Again with respect to said specific pattern 11, FIG. 2A to 2D depict magnified views of a section of different exemplary embodiments of a reflector according to the reflector 10.

Figure 2A:
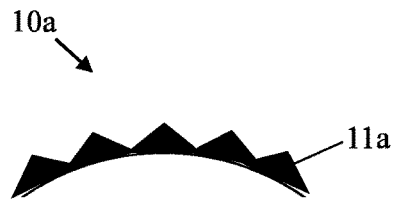
FIG. 2A shows a magnified view of a section of an exemplary embodiment of a reflector comprising a resistive material along its edges in a specific pattern.

According to FIG. 2A, a magnified view of a section 10a of an exemplary embodiment of a reflector comprising a resistive material along its edges in a specific pattern 11a is shown, wherein the specific pattern 11a of the resistive material is configured to form triangles, preferably isosceles triangles, more preferably symmetric isosceles triangles. Additionally or alternatively, the resistive material may be configured to form pyramids.

Figure 2B:
FIG. 2B shows a magnified view of a section of a further exemplary embodiment of a reflector comprising a resistive material along its edges in a specific pattern.

Furthermore, FIG. 2B illustrates a magnified view of a section 10b of a further exemplary embodiment of a reflector comprising a resistive material along its edges in a specific pattern 11b. In this exemplary embodiment, the specific pattern 11b of the resistive material is configured to form ellipses or sections of an ellipse, respectively, on the edges of the reflector. Additionally or alternatively, the resistive material may be configured to form ellipsoids or sections of an ellipsoid.

Figure 2C:
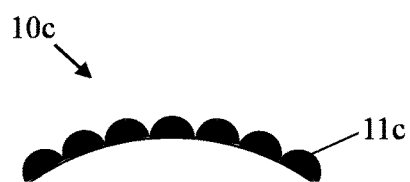
FIG. 2c shows a magnified view of a section of a further exemplary embodiment of a reflector comprising a resistive material along its edges in a specific pattern.

With respect to FIG. 2C, a magnified view of a section 10c of a further exemplary embodiment of a reflector comprising a resistive material along its edges in a specific pattern 11c is shown, wherein the specific pattern 11c of the resistive material is configured to form circles or sections of a circle, respectively, on the edges of the reflector. Additionally or alternatively, the resistive material may be configured to form spheres or sections of a sphere.

Figure 2D:
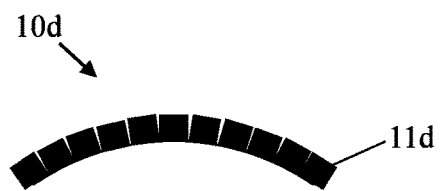
FIG. 2D shows a magnified view of a section of a further exemplary embodiment of a reflector comprising a resistive material along its edges in a specific pattern.

In accordance with FIG. 2D, a magnified view of a section 10d of a further exemplary embodiment of a reflector comprising a resistive material along its edges in a specific pattern 11d is shown. In this exemplary embodiment, the specific pattern 11d of the resistive material is configured to form rectangles, especially squares, on the edges of the reflector. Additionally or alternatively, the resistive material may be configured to form cuboids, especially cubes.

In addition to FIGS. 1, and 2A to 2D, with respect to the respective specific patterns 11, 11a, 11b, 11c, 11d, it is noted that the largest dimension of the above-mentioned geometrical shapes forming the specific pattern of resistive material may be roughly equal to the measurement wavelength. In particular, the largest dimension of at least one of the above-mentioned geometrical shapes may be lower than the measurement wavelength multiplied by 100, preferably lower than the measurement wavelength multiplied by 10, more preferably lower than the measurement wavelength multiplied by 5, most preferably between the measurement wavelength multiplied by 0.7 and the measurement wavelength multiplied by 2.3.

In this context, it is further noted that a specific pattern of resistive material may generally comprise various geometrical shapes. As a consequence of this, at least two of the above-mentioned geometrical shapes may be mixed in order to form a specific pattern of resistive material.

Figure 3:
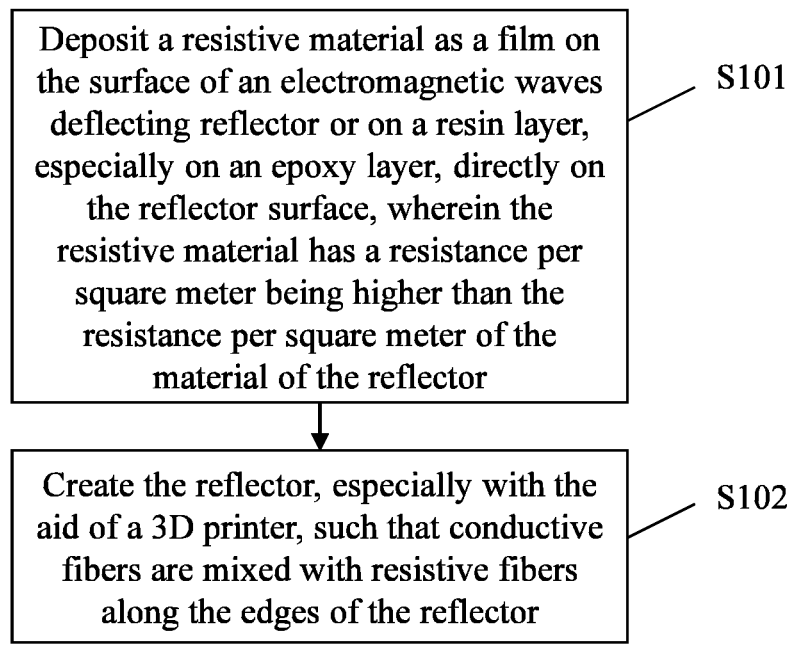
FIG. 3 shows a flow chart of an exemplary embodiment of the second aspect of the invention.

Now, FIG. 3 shows a flow chart of the inventive reflector manufacturing method. In a first step S101, a resistive material is deposited as a film on the surface of an electromagnetic waves deflecting reflector or on a resin layer, especially on an epoxy layer, directly on the reflector surface, wherein the resistive material has a resistance per square meter being higher than the resistance per square meter of the material of the reflector. Then, in a second step S102, the reflector the reflector is created, especially with the aid of a 3D printer, such that conductive fibers are mixed with resistive fibers along the edges of the reflector.

Figure 4:
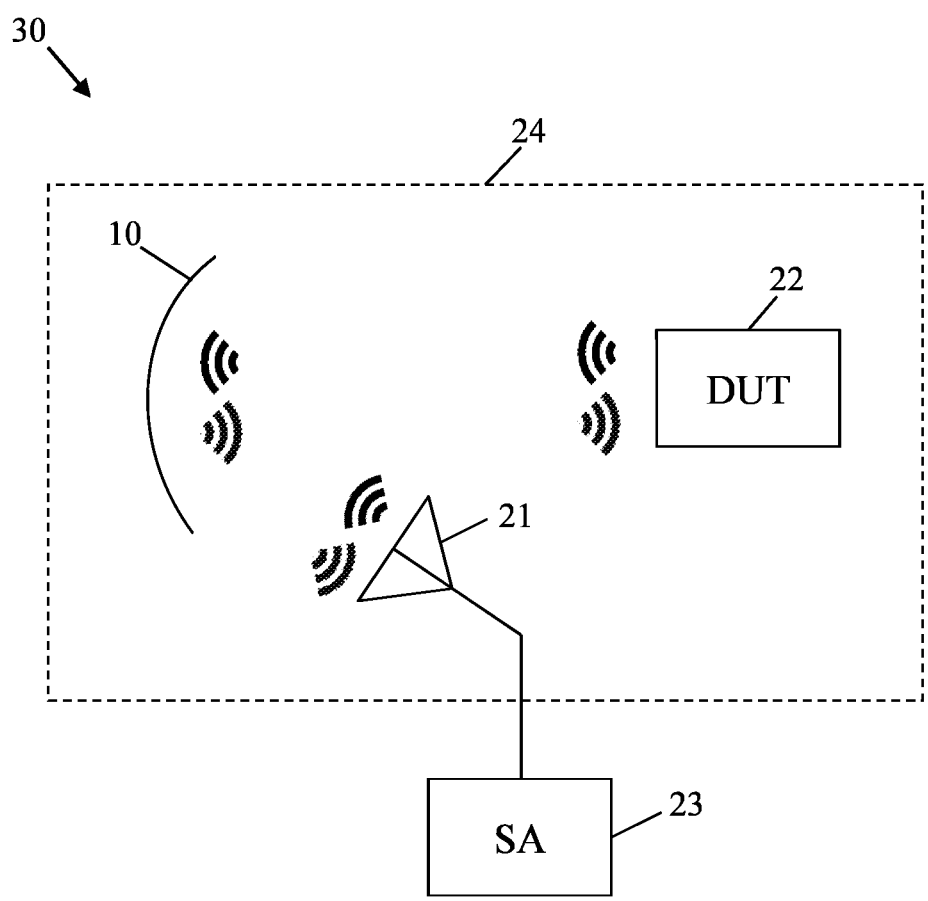
FIG. 4 shows an exemplary embodiment of the third aspect of the invention.

Furthermore, with respect to FIG. 4, an exemplary embodiment of a measurement system 30 according to the third aspect of the invention is depicted. Said measurement system 30 comprises the above-mentioned reflector 10, generally at least one reflector according to the first aspect of the invention, a measurement antenna 21, a signal analysis unit 23 connected to the measurement antenna 21, and a device under test 22.

In this context, the reflector 10 is arranged with respect to the measurement antenna 21 such that the reflector 10 collimates plane wave components to the device under test 22 which is located outside a quiet zone. Additionally or alternatively, the reflector 10 is arranged with respect to the measurement antenna 21 such that the reflector 10 forms a planar wave from the measurement antenna 21 within a region of a quiet zone located between the reflector 10 and the device under test 22.

In addition to this, the signal analysis unit 23 is configured to communicate with the device under test 22 with the aid of electromagnetic waves radiated and/or received by the measurement antenna 21 and redirected by the reflector 10.

As it can be also seen from FIG. 4, the measurement system further comprises a shielded room or chamber 24, wherein the device under test 22, the measurement antenna 21, and the reflector 10 are within the shielded room or chamber 14. As a consequence of this, interferences are reduced to a minimum.

Figure 5:
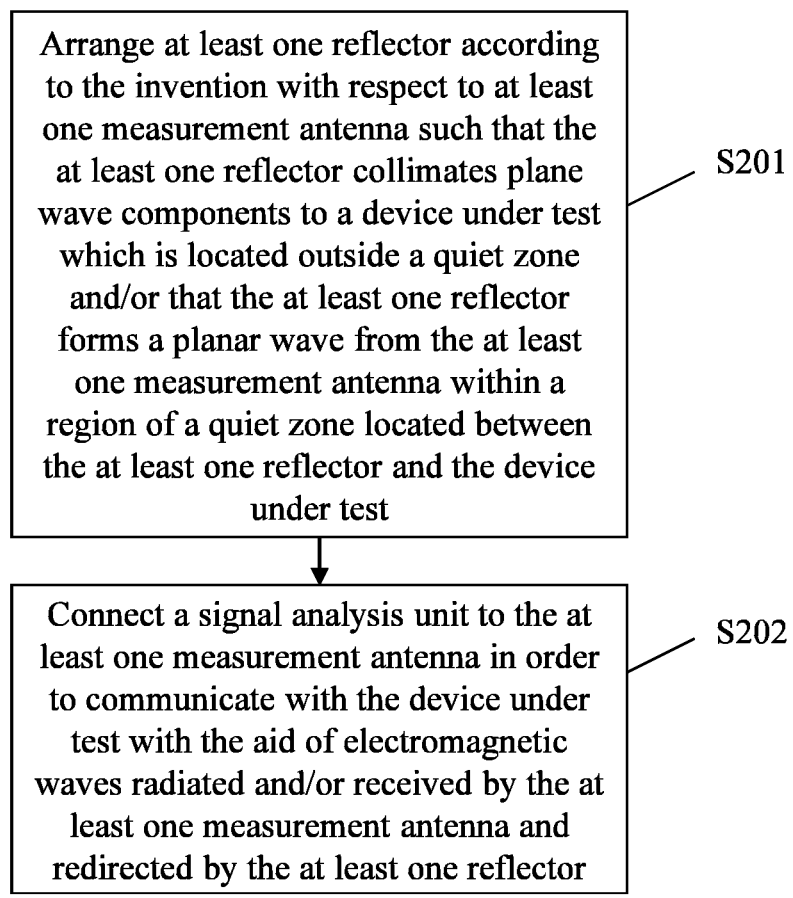
FIG. 5 shows a flow chart of an exemplary embodiment of the fourth aspect of the invention.

Finally, FIG. 5 shows a flow chart of the inventive measurement method. In a first step S201, at least one reflector according to the invention is arranged with respect to at least one measurement antenna such that the at least one reflector collimates plane wave components to a device under test which is located outside a quiet zone and/or that the at least one reflector forms a planar wave from the at least one measurement antenna within a region of a quiet zone located between the at least one reflector and the device under test. Then, in a second step S202, a signal analysis unit is connected to the at least one measurement antenna in order to communicate with the device under test with the aid of electromagnetic waves radiated and/or received by the at least one measurement antenna and redirected by the at least one reflector.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A reflector for deflecting electromagnetic waves,
    wherein the reflector comprises a resistive material along its edges in a specific pattern, wherein the resistive material has a resistance per square meter being higher than the resistance per square meter of the material of the reflector in order to attenuate or absorb electromagnetic energy of the electromagnetic waves, and
    wherein the specific pattern is configured such that portions, especially attenuated portions, of the electromagnetic energy are diffracted away from a quiet zone with respect to the reflector, or
    wherein the specific pattern is configured such that portions, especially attenuated portions, of the electromagnetic energy are diffracted out of phase in a manner that the electromagnetic waves destructively interfere.

2. The reflector according to claim 1,
    wherein the reflector is at least partly of parabolic shape.

3. The reflector according to claim 1,
    wherein the specific pattern of the resistive material is configured to form at least one triangle, preferably at least one isosceles triangle, more preferably at least one symmetric isosceles triangle, on at least one edge of the reflector.

4. The reflector according to claim 1,
wherein the specific pattern of the resistive material is configured to form at least one ellipsoid on at least one edge, especially on at least one rolled edge, of the reflector.

5. The reflector according to claim 1,
wherein the resistive material is deposited as a film on the reflector surface or on an epoxy layer directly on the reflector surface.

6. The reflector according to claim 1,
wherein along the edges of the reflector, conductive fibers are mixed with resistive fibers.

7. The reflector according to claim 1,
wherein the resistance per square meter of the resistive material is between 30 milliohms and 10000 ohms, preferably between 100 milliohms and 5000 ohms, more preferably between 300 milliohms and 3000 ohms, most preferably between 1 ohm and 1000 ohm.

8. A measurement system comprising:
at least one reflector according to claim 1,
at least one measurement antenna, and
a device under test,
wherein the at least one reflector is arranged with respect to the at least one measurement antenna such that the at least one reflector collimates plane wave components to the device under test which is located outside a quiet zone and/or that the at least one reflector forms a planar wave from the at least one measurement antenna within a region of a quiet zone located between the at least one reflector and the device under test.

9. The measurement system according to claim 8,
wherein the measurement system further comprises a signal analysis unit, which is configured to communicate with the device under test with the aid of electromagnetic waves radiated and/or received by the at least one measurement antenna and redirected by the at least one reflector.

10. The measurement system according to claim 8,
wherein the at least one reflector is at least partly of a parabolic shape.

11. The measurement system according to claim 8,
wherein the measurement system further comprises a shielded room or chamber, wherein at least the device under test, the at least one measurement antenna, and the at least one reflector are within the shielded room or chamber.

12. A measurement method comprising the step of:
arranging at least one reflector according to claim 1 with respect to at least one measurement antenna such that the at least one reflector collimates plane wave components to a device under test which is located outside a quiet zone and/or that the at least one reflector forms a planar wave from the at least one measurement antenna within a region of a quiet zone located between the at least one reflector and the device under test.

13. The measurement method according to claim 12,
wherein the measurement method further comprises the step of connecting a signal analysis unit to the at least one measurement antenna in order to communicate with the device under test with the aid of electromagnetic waves radiated and/or received by the at least one measurement antenna and redirected by the at least one reflector.

14. The measurement method according to claim 13,
wherein the at least one reflector is at least partly of a parabolic shape.

15. The measurement method according to claim 12,
wherein the measurement method further comprises the step of performing measurements within a shielded room or chamber, wherein at least the device under test, the at least one measurement antenna, and the at least one reflector are within the shielded room or chamber.

\* \* \* \* \*